(12) United States Patent
Yu

(10) Patent No.: US 6,290,297 B1
(45) Date of Patent: Sep. 18, 2001

(54) LATCH ASSEMBLY AND SEAT HINGE WITH INTERLOCK

(75) Inventor: Shihong Yu, Troy, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 09/407,494

(22) Filed: Sep. 28, 1999

Related U.S. Application Data

(63) Continuation-in-part of application No. 09/136,132, filed on Aug. 18, 1998, now Pat. No. 6,161,899.

(51) Int. Cl.$^7$ .................................................. B60N 2/02
(52) U.S. Cl. ..................................................... 297/378.12
(58) Field of Search ........................... 297/354.12, 361.1, 297/366, 367, 368, 369, 378.12, 316, 340; 296/65.01, 65.05

(56) References Cited

U.S. PATENT DOCUMENTS

| | | |
|---|---|---|
| 4,010,979 | 3/1977 | Fisher, III et al. . |
| 4,076,309 | 2/1978 | Chekirda et al. . |
| 4,219,234 | 8/1980 | Bell . |
| 4,484,779 | * 11/1984 | Suzuki . |
| 4,579,387 | 4/1986 | Bell . |
| 4,634,182 | 1/1987 | Tanaka . |
| 4,645,263 | 2/1987 | Fourrey et al. . |
| 4,659,146 | 4/1987 | Janiaud . |
| 4,687,252 | 8/1987 | Bell et al. . |
| 4,720,145 | 1/1988 | Bell . |
| 4,733,912 | 3/1988 | Secord . |
| 4,747,641 | 5/1988 | Bell . |
| 4,789,205 | 12/1988 | Pipon et al. . |
| 4,795,213 | 1/1989 | Bell . |
| 4,822,100 | 4/1989 | Bell . |
| 4,874,205 | 10/1989 | Arefinejad et al. . |
| 5,380,060 | 1/1995 | Sponsler et al. . |
| 5,425,568 | 6/1995 | Sliney et al. . |
| 5,460,429 | 10/1995 | Whalen . |
| 5,476,307 | 12/1995 | Whalen . |
| 5,489,141 | 2/1996 | Strausbaugh et al. . |
| 5,492,389 | 2/1996 | McClintock et al. . |
| 5,590,932 | 1/1997 | Olivieri . |
| 5,718,482 | 2/1998 | Robinson . |
| 5,749,625 | 5/1998 | Robinson . |
| 5,939,286 | 8/1999 | Jones et al. . |

FOREIGN PATENT DOCUMENTS

| | | |
|---|---|---|
| 1546104 | 5/1979 | (GB) . |

* cited by examiner

Primary Examiner—Milton Nelson, Jr.
(74) Attorney, Agent, or Firm—Harness, Dickey & Pierce, P.L.C.

(57) ABSTRACT

A latch assembly with an interlock incorporatable into a seat hinge assembly for use in a vehicle connectable to a striker on a vehicle body. The seat hinge assembly includes a lower hinge member, an upper hinge member, a first latching mechanism, second latching mechanism, and an interlock operatively coupled to the first and second latching mechanisms. The first latching mechanism is operable in a latched mode to couple the lower hinge member to a striker and in an unlatched mode to allow movement of the lower hinge member relative to the striker. The second latching mechanism is operable in a locked mode for securing the upper hinge members in a fixed position relative to the lower hinge member and in an unlocked mode to allow movement of the upper hinge member relative to the lower hinge member. The interlock is operable in a disabling mode when the first latching mechanism is in its unlatched mode and in an enabling mode when the first latching mechanism is in its latched mode. In its disabling mode the interlock prevents movement of the second latching mechanism from its unlocked mode to its locked mode. Conversely, when in its enabling mode, the interlock allows movement of the second latching mechanism from its unlocked mode to its locked mode.

34 Claims, 13 Drawing Sheets

LATCH ASSEMBLY AND SEAT HINGE WITH INTERLOCK

CROSS-REFERENCE TO RELATED APPLICATION

The present invention is a continuation-in-part of U.S. Ser. No. 09/136,132, filed Aug. 18, 1998, now U.S. Pat. No. 6,161,899, hereby expressly incorporated by reference.

BACKGROUND OF THE INVENTION

The present invention relates generally to locking pivot mechanisms and, more particularly, to a seatback latch mechanism operable for locking a seatback in an upright position and a folded position. The present invention further relates to a fold latch and floor latch for selectively placing the vehicle seat in stowed and deployed positions with an interlock interconnecting the fold and floor latches to insure a predetermined sequence of latch operation.

Seat assemblies of the type used in motor vehicles are commonly equipped with locking pivot mechanisms which can be selectively actuated to permit angular adjustment of the seatback relative to the seat bottom, thereby providing added comfort and convenience for the seat occupant. Typically, these locking pivot mechanisms include a housing fixed to the seat bottom, a quadrant fixed to the seatback and which is supported from the housing for pivotal movement about a first pivot point, a lock pawl supported from the housing for pivotal movement about a second pivot point, and a release actuator for causing movement of the lock pawl between first and second positions. In its first position, teeth on the lock pawl engage teeth on the quadrant for preventing movement of the quadrant about the first pivot point, thereby releasably locking the seatback in a desired position. In contrast, movement of the lock pawl to its second position causes its teeth to disengage the teeth on the quadrant and permit angular movement of the seatback to a desired position. Typically, the release actuator includes a spring-biased cam for normally locating the locking pawl in its first position. In many seating applications, this type of locking pivot mechanism is used as a seat recliner to permit selective adjustment of the seatback between an upright position and a fully-reclined position.

Recently, however, with the increased popularity of pickup trucks, mini-vans, and sport-utility vehicles, there has been an interest in developing seat assemblies in which the seatback is capable of folding forward to a dumped position for providing improved accessibility to storage space or providing increased cargo area. In pickup trucks, the ability to fold the front seatbacks completely forward permits access to the rearward cab compartment. In mini-vans and sport-utility vehicles, the ability to fold the rear seatbacks completely forward enables the cargo space to be increased or ingress to be simplified. In known designs, the seat assembly is equipped with a seatback dump mechanisms which typically employs some variation of a pawl-type locking pivot mechanism. Although pawl type pivot mechanisms enable a seatback to be reclined to a substantially flat position, they may not enable the seatback to be folded completely forward to improve accessibility to storage space or provide increased cargo area. Furthermore, it should be appreciated that vehicular seats must be capable of withstanding extreme forward and rearward forces which result from belt loading caused during a collision incident. In pawl-type pivot mechanisms, these forces are transmitted to the pawl and the quadrant. As such, the cam must be designed to withstand these extreme forces, which increases the complexity and cost of the seatback dump mechanism.

Consistent with the above focus, there has been a recent interest in developing seat assemblies that are movable between stowed and deployed positions to improve accessibility to storage space and rearward seating areas or provide increased cargo area. The stowable seats often times include a latch mechanism that is operable to releasably connect a portion of the seat to the vehicle floor allowing the seat to be tilted between its deployed and stowed positions. While existing mechanisms are generally effective at performing their intended functions, they present packaging problems resulting from the operative components of the latch mechanism being exposed within the interior of the vehicle, particularly when the mechanism is in its unlatched mode. These problems are particularly noticeable when the latching mechanism is used in foldable vehicle seat applications where the exposed hook or claw of the latch mechanism has a tendency to snag clothing or stored articles when the seat is in its forward tilted position.

When seats include such a latch mechanism as well as a seatback dump mechanism, it is often times important that the occupant manipulate the respective latches in a specific sequence to insure proper positioning of the seat in its deployed and stowed positions. In order to eliminate the need for the occupant to effectively manage the inter-related latches, seats have included interlock devices for ensuring proper sequencing. While existing interlock mechanisms are also generally effective at performing their intended functions, the present invention provides operational advantages directed to consistency of operation as well as a more cost effective and simplified interlock arrangement.

Accordingly, a need exists in the relevant art to provide a seatback dump mechanism for latching the seatback in an upright position and a folded position so as to enable improved ingress and versatility of the vehicle. Furthermore, a need exists in the relevant art to provide a seatback dump mechanism capable of providing the folding function while maximizing structural integrity of the seatback dump mechanism and simultaneously minimizing the overall cost of the system. Additionally, a continuing need exists to develop an interlock for intercoupling latch assemblies to ensure proper sequence of operation while doing so in an efficient, cost-effective, and durable manner.

SUMMARY OF THE INVENTION

In accordance with the broad teachings of this invention, a seatback latch mechanism having an advantageous construction is disclosed.

According to a first embodiment of the present invention, a seatback latch mechanism is provided having a quadrant adapted to be secured to support structure associated with a seat assembly or a motor vehicle. The quadrant includes a cam segment defining an arcuate dwell surface which extends between first and second locking surfaces. The seatback latch mechanism further includes a seatback support member supported for pivotal movement relative to the quadrant between an "upright" position and a "folded" position. The support member is adapted to support and pivotally couple the seatback of a seat assembly to the seat bottom. A locking pin is coupled to the seatback support member for selectively engaging one of the first or second locking surfaces, thereby defining the upright position and the folded position, respectively. The seatback latch mechanism still further includes a release actuator for disengaging the locking pin from the first and second locking surfaces, whereby the locking pin engages the dwell surface to permit the seatback to be moved to the other of the upright and folded positions.

According to the first embodiment of the present invention, the seatback latch mechanism further includes first and second stop members. The first and second stop members prevent the seatback support member from pivoting beyond the upright and folded positions.

According to the first embodiment of the present invention, the release actuator includes a handle pivotally mounted to the seatback support member, and a locking cam fixed to the handle for selectively urging the locking pin into engagement with the first or second locking surfaces. A biasing spring is operable for urging the locking cam into engagement with the locking pin and assists in maintaining engagement of locking pin with one of the locking surfaces.

It is an object of a second embodiment of the invention to provide a seat hinge assembly for use with a vehicle seat in combination with first and second latching mechanisms to prevent movement of one of the latching mechanisms when the other latching mechanism is in a predetermined mode.

A further object of the second embodiment of the present invention is to provide a seat hinge assembly with an interlock operable in a disabling mode when a first latching mechanism is in an unlatched mode to prevent movement of a second latching mechanism from its unlocked mode to its locked mode.

Still another object of the second embodiment of the present invention is to provide an interlock assembly for sequencing operations of first and second latching mechanisms wherein the interlock assembly is simple to manufacture, durable in its intended application, and provides cost and functional advantages over existing interlocks.

According to a preferred construction, the seat hinge assembly of the second embodiment of the present invention includes a lower hinge member, an upper hinge member, a first latching mechanism, second latching mechanism, and an interlock operatively engaging the first and second latching mechanisms. The first latching mechanism is operable in a latched mode to couple one of the lower and upper hinge members to a striker and in an unlatched mode to allow movement of the lower hinge member relative to the striker. The second latching mechanism is operable in a locked mode for securing the other of the lower and upper hinge members in a fixed position relative to the first of the lower and upper hinge members and in an unlocked mode to allow movement of the upper hinge member relative to the lower hinge member. The interlock is operable in a disabling mode when the first latching mechanism is in its unlatched mode and in an enabling mode when the first latching mechanism is in its latched mode. In its disabling mode the interlock prevents movement of the second latching mechanism from its unlocked mode to its locked mode. Conversely, when in its enabling mode, the interlock allows movement of the second latching mechanism from its unlocked mode to its locked mode.

Further areas of applicability of the present invention will become apparent from the detailed description provided hereinafter. It should be understood, however, that the detailed description and specific examples, while indicating the preferred embodiment of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
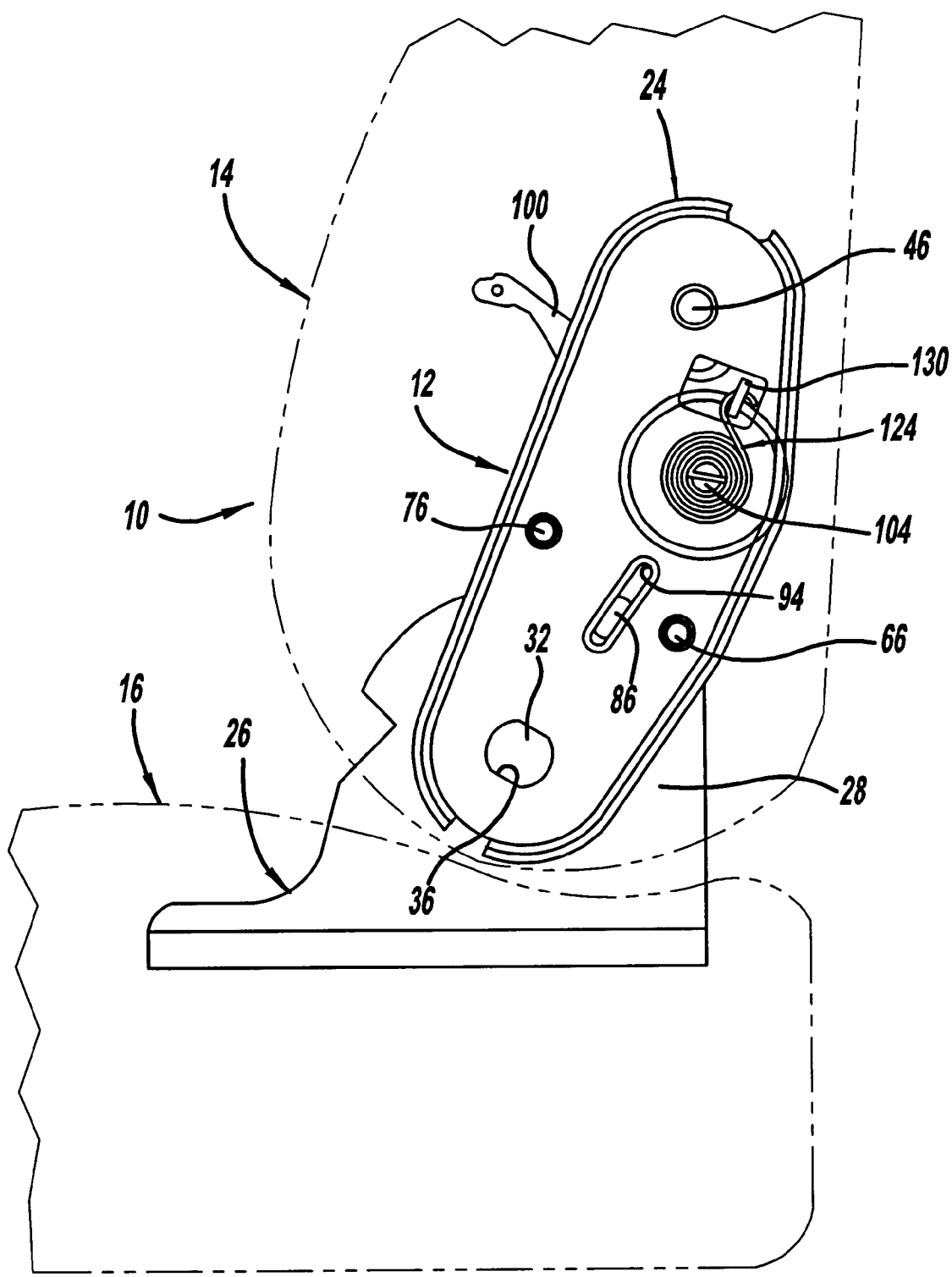
FIG. 1 is a side elevational view, with portions shown in phantom, of a vehicle seat assembly equipped with a seatback latch mechanism for latching the seatback in an upright position.

The following description of the preferred embodiment(s) is merely exemplary in nature and is in no way intended to limit the invention, its application, or uses.

Referring to the drawings, a vehicle seat assembly 10 incorporating a seatback latch mechanism 12 in accordance with the present invention is shown. In particular, seatback latch mechanism 12 is a locking pivot mechanism operable for supporting a seatback 14 for selective pivotal movement relative to a seat bottom 16 between a first or "upright" position and a second or "folded" position. Seat bottom 16 may be mounted to the floor pan or fender well of the vehicle; the frame structure of a bench-type seat; the seat pan in a stand-alone seat assembly; or any other equivalent vehicle-mounted support structure to which a seat bottom is fixed. Thus, seat assembly 10 is exemplary of the type conventionally used as a front seat in pickup trucks or the second and third row rear seats in sport-utility vehicles and mini-vans.

Seatback latch mechanism 12 is normally operable for latching seatback 14 in a desired use position (i.e., the upright position). Seatback latch mechanism 12 is further operable to permit seatback 14 to be released for movement from its upright position to a substantially horizontal position (i.e., its folded position) relative to seat bottom 16. Seatback latch mechanism 12 further functions to latch seatback 14 in its folded position. Depending on loading conditions, it is anticipated that seat assembly 10 may include either one or a pair of interconnected seatback latch mechanisms 12.

Figure 2:
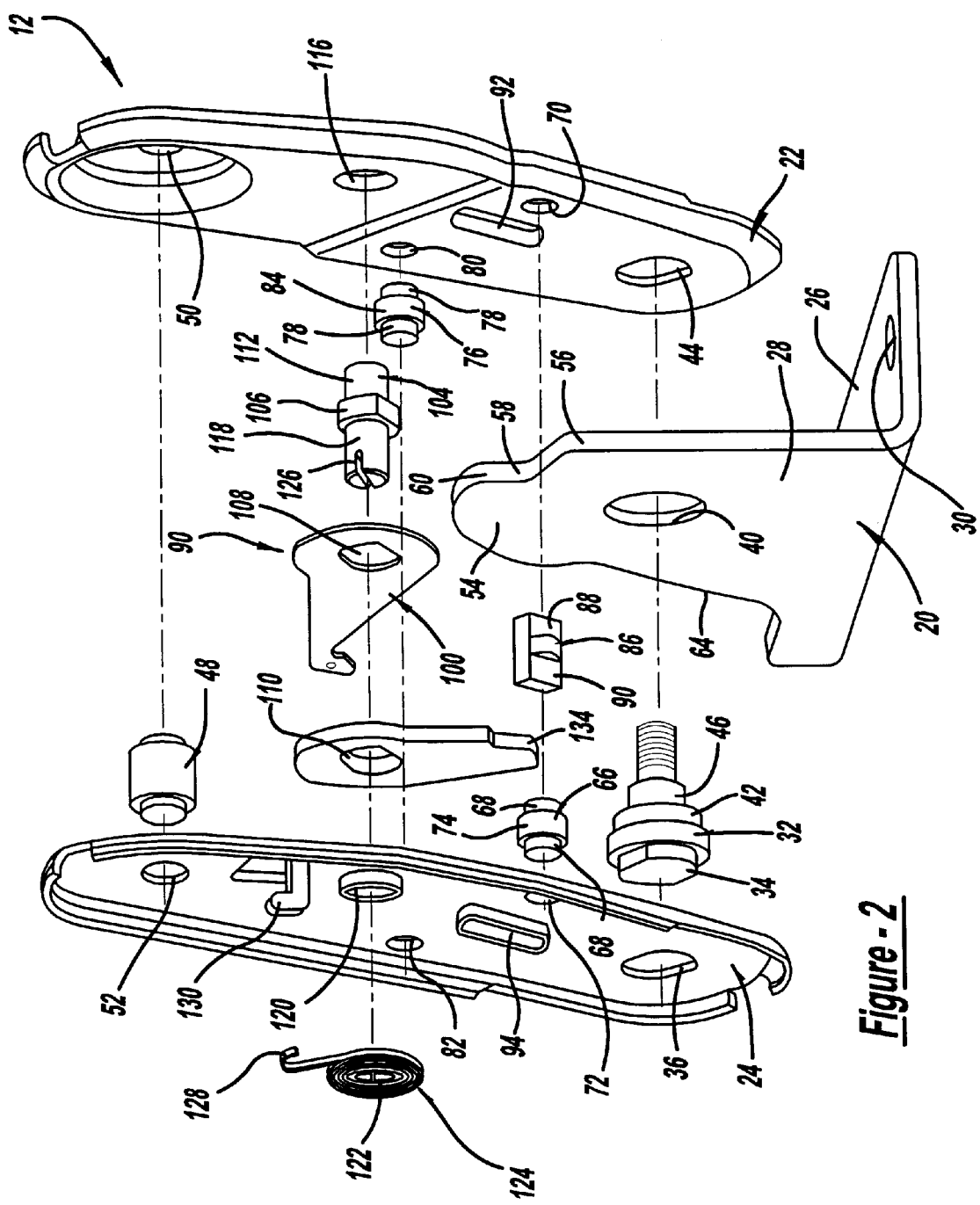
FIG. 2 is an exploded perspective view of the seatback latch mechanism.
Figure 3:
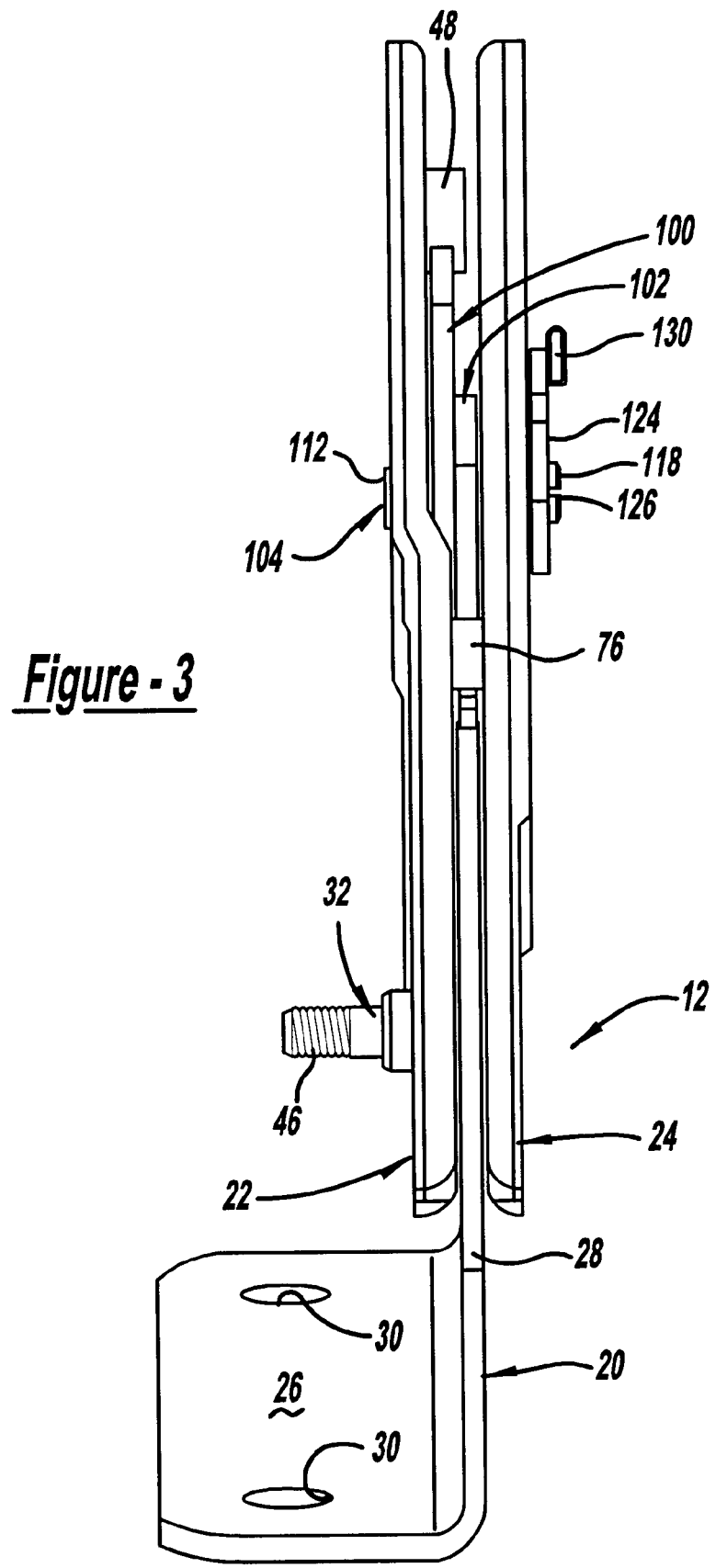
FIG. 3 is a perspective end view of the latch mechanism.

As best seen from FIGS. 2 and 3, seatback latch mechanism 12 includes a quadrant 20 and a pair of interconnected support plates 22 and 24. Quadrant 20 includes a base plate segment 26 and pivot plate segment 28. Base plate segment 26 is adapted to be rigidly mounted to suitable frame structure of seat assembly 10 and/or the vehicles floor plan such as by fasteners (not shown) mounted in apertures 30. A pivot fastener 32 is provided for mounting support plates 22 and 24 for synchronous pivotal movement relative to pivot plate segment 28 of quadrant 20. In particular, a drive segment 34 of pivot fastener 32 is retained in a similarly-shaped aperture 36 formed in outer support plate 24, a first cylindrical segment 38 of pivot fastener 32 is rotatably supported in a journal aperture 40 formed in pivot plate segment 28 of quadrant 20, and a second cylindrical segment 42 of pivot fastener 32 is retained in an aperture 44 formed in inner support plate 22. A Threaded stud segment 46 extends from pivot fastener 32 and is adapted to permit a suitable frame portion of seatback 14 to be mounted thereto for pivotal movement with support plates 22 and 24. In addition to other components hereinafter described, a hollow mounting sleeve 48 extends between aligned apertures 50 and 52 formed in support plates 22 and 24 to permit another fastener to pass therethrough for connecting the uppermost portion of support plates 22 and 24 to seatback 14.

Figure 4:
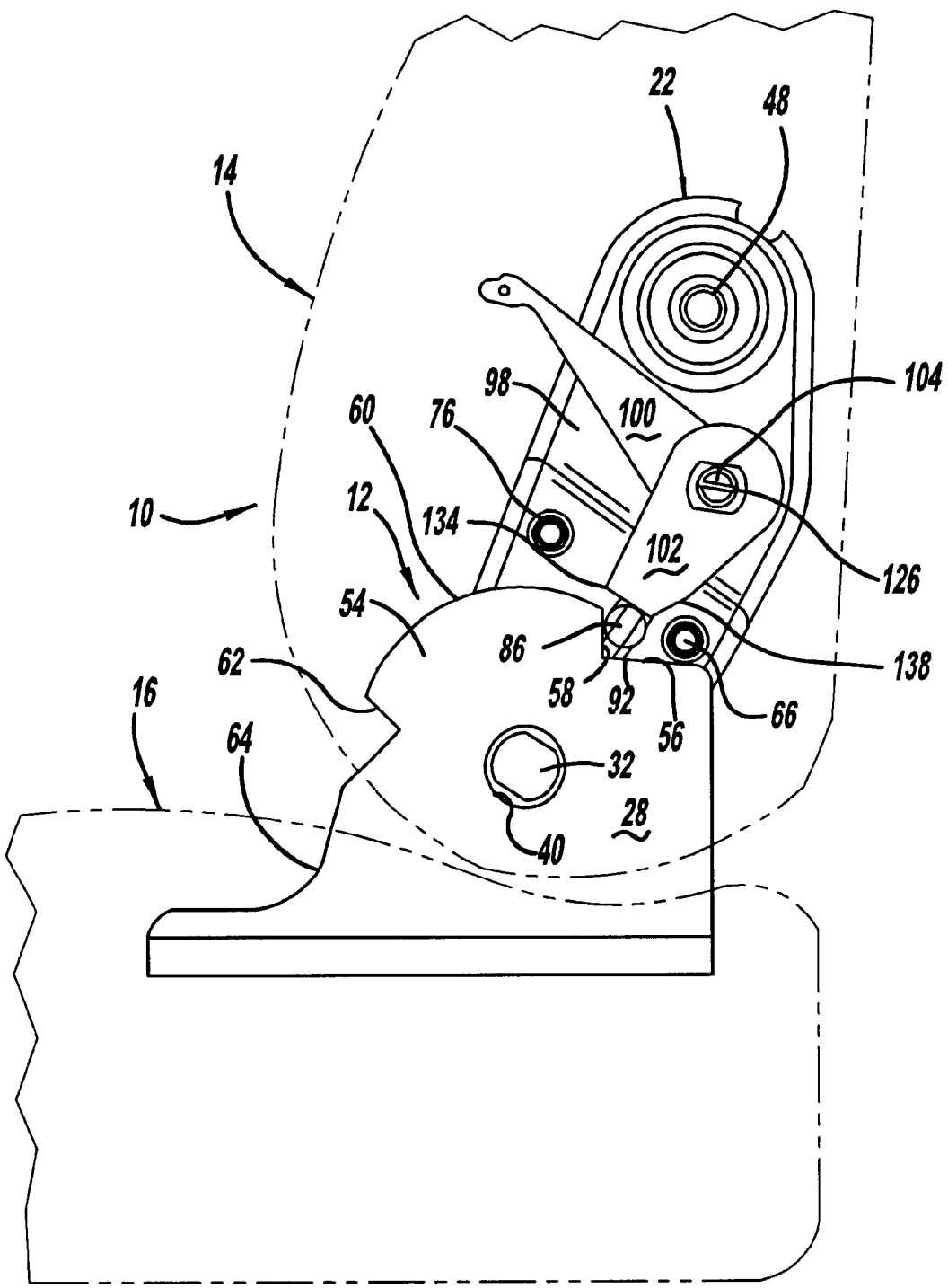
FIG. 4 is a side elevational view of the seatback latch mechanism shown in FIG. 1 with some components removed for greater clarity with the seatback latched in its upright position.
Figure 6:
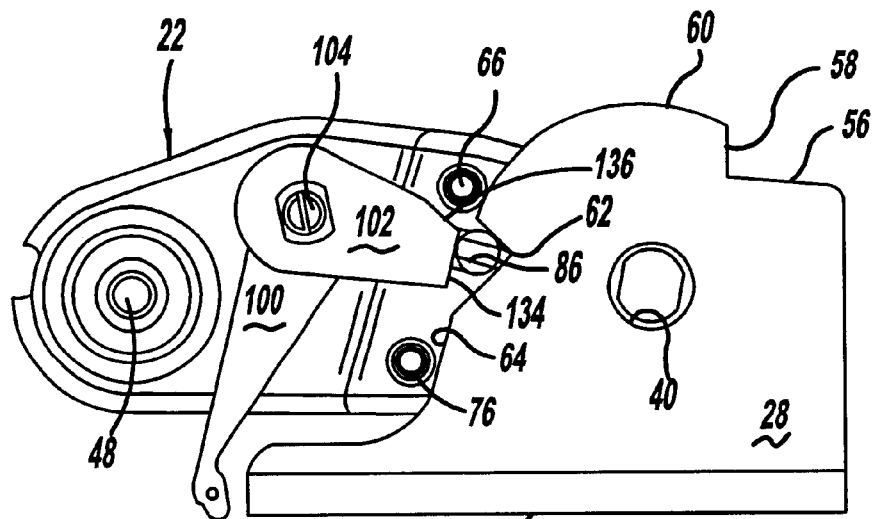
FIG. 6 is a side elevational view of the seatback latch mechanism, similar to FIGS. 4 and 5, but showing the seatback latched in its folded position.

Pivot plate segment 28 of quadrant 20 includes a raised cam segment 54 having an edge profile sequentially defining a first stop surface 56, a first lock surface 58, a dwell surface 60, a second lock surface 62, and a second stop surface 64. A first stop pin 66 has end segments 68 retained in aligned apertures 70 and 72 formed respectively in support plates 22 and 24 and a central cylindrical segment 74 which is adapted to engage first stop surface 56 when seatback 14 is in its upright position, as shown in FIGS. 1 and 4. Similarly, a second stop pin 76 has end segments 78 retained in aligned apertures 80 and 82 formed respectively in support plates 22 and 24 and a central cylindrical segment 84 which is adapted to engage second stop surface 64 when seatback 14 is in its folded position, as shown in FIG. 6.

To provide means for releasably latching seatback 14 in both of its upright and folded positions, seatback latch mechanism 12 includes a lock pin 86 having end segments defining rectangular guide lugs 88 and 90 that are retained for sliding non-rotational movement in a pair of aligned guide slots 92 and 94 respectively formed in support plates 22 and 24. Lock pin 86 further includes a central cylindrical segment 96 that is adapted to engage one of first lock surface 58, dwell surface 60, and second lock surface 62. A spring-biased release actuator 98 is provided for maintaining engagement of cylindrical segment 96 of lock pin 86 with first lock surface 58 to releasably latch seatback 14 in its upright position. Release actuator 98 is further operable for maintaining engagement of cylindrical segment 96 of lock pin 86 with second lock surface 62 to releasably latch seatback 14 in its folded position. Finally, release actuator 98 can be selectively manipulated to release cylindrical 96 of lock pin 86 from latched engagement with first and second lock surfaces 58 and 62 for sliding movement along dwell surface 60 of cam segment 54 in response to movement of seatback 14 between its upright and folded positions.

Release actuator 98 includes a release handle 100 and a lock cam 102, both of which are fixed to a pivot pin 104 which, in turn, is rotatably supported between support plates 22 and 24. In particular, pivot pin 104 has a non-circular drive lug 106 extending through similarly-shaped apertures 108 and 110 formed respectively in handle 100 and lock cam 102. A first cylindrical end segment 112 of pivot pin 104 is journally supported in an aperture 116 formed in support plate 22 while an elongated second cylindrical end segment 118 of pivot pin 104 is journally supported in an aperture 120 formed in support plate 24. An inner end 122 of a biasing spring 124 is fixed to a groove 126 in second end segment 118 of pivot pin 104 and an outer end 128 of biasing spring 124 is hooked on a retainer flange 130 extending from support plate 24. Biasing spring 124 is arranged to continuously exert a rotational biasing force on pivot pin 104 for urging handle 100 and lock cam 102 to rotate in a first (i.e., counterclockwise in the drawings) direction.

Referring primarily to FIGS. 1 and 4, seatback latch mechanism 12 is shown operating to latch seatback 14 in its upright position. To provide this locking function, biasing spring 124 biases handle 100 to a non-actuated position and lock cam 102 to a first position whereat an arcuate cam surface 134 on the end of lock cam 102 acts on cylindrical segment 96 of lock pin 86 for loading lock pin 86 against first lock surface 58. With lock cam 102 in its first position, lock pin 86 engages first lock surface 58 for preventing forward movement of seatback 14 while first stop pin 66 abuts first stop surface 56 for preventing rearward movement of seatback 14. This latching arrangement also functions to prevent clucking of seatback 14 relative to seat bottom 16 with seatback 14 latched in its upright position.

Figure 5:
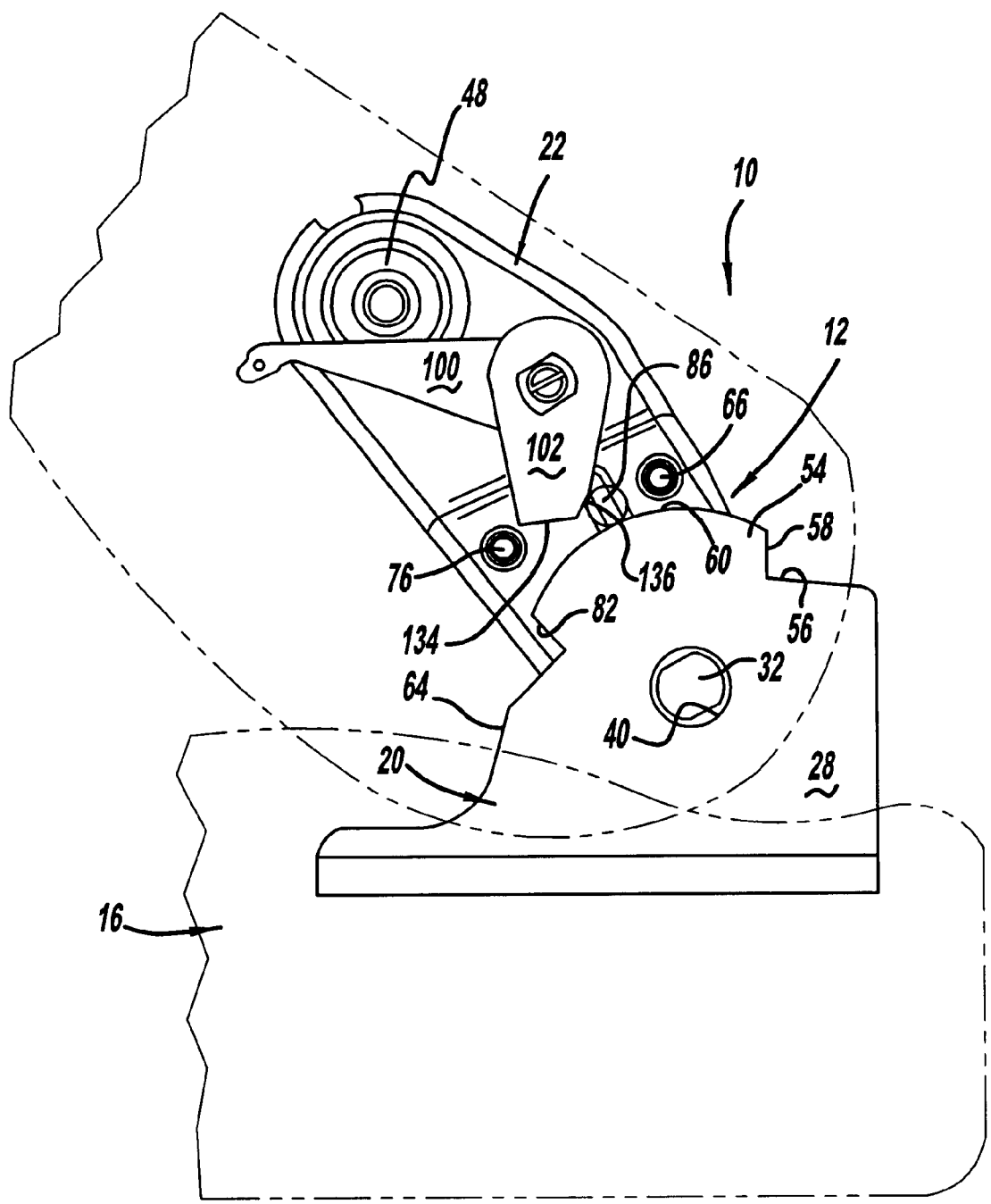
FIG. 5 is a side elevational view of the seatback latch mechanism, similar to FIG. 4, but showing the seatback in a disengaged intermediate position between its upright and folded positions.

When it is desired to release seatback 14 for movement to its folded position, handle 100 is rotated in a second direction (i.e., clockwise) to an actuated position for rotating lock cam 102 to a second position, in opposition to biasing of spring 124, such that cam surface 134 of lock cam 102 is released from engagement with cylindrical segment 96 of lock pin 86. With handle 100 initially held in its actuated position, subsequent rotation of support plates 22 and 24 about pivot fastener 32 cause lock pin 86 to initially move upwardly in guide slots 92, 94 until cylindrical segment 96 of lock pin 86 is in engagement with dwell surface 60 and a trailing edge surface 136 of lock cam 102, as shown in FIG. 5. Specifically, the angular relationship of guide slots 92 and 94 relative to first lock surface 58 facilitates the ramping movement of cylindrical segment 96 of lock pin 86 up first lock surface 58 and onto dwell surface 60. With cylindrical segment 96 of lock pin 86 sliding on dwell surface 60, lock cam 102 is held in its second position and handle 100 is held in its activated position in opposition to the biasing of biasing spring 124. Once seatback 14 is in its folded position, cylindrical segment 96 of lock pin 86 disengages dwell surface 60 and is aligned adjacent to second lock surface 62. Immediately thereafter, biasing spring 124 urges handle 100 to return to rotate to its non-actuated position and lock cam 102 to rotate back to its first position whereat cam surface 134 re-engages cylindrical segment 96 of lock pin 86 for loading lock pin 86 against second lock surface 62 and latching seatback in its folded position, as shown in FIG. 6. As is also shown, second stop pin 76 engages second stop surface 64 to prevent excessive forward movement of seatback 14 past its folded position. To return seatback 14 from its folded position to its upright position, handle 100 must again be rotated to its actuated position for moving lock cam 102 to its second position for disengaging cam surface 134 of lock cam 102 from cylindrical segment 96 of lock pin 86. The angular relationship between second lock surface 62 and guide slots 92 and 94 permit lock pin 86 to ramp up second lock surface 62 and onto dwell surface 60 in response to initial movement of support plates 22, 24 relative to quadrant 20.

According to the novel configuration of the present invention, lock cam 102 is adapted to selectively engage locking pin 86 with either first lock surface 58 or second lock surface 62. This unique arrangement permits forward and rearward loading forces to be transmitted from support plates 22 and 24 through either lock pin 86 or stop pins 66 and 76 directly to quadrant 20. As such, minimal forces are transmitted from lock pin 86 to lock cam 102 and pivot pin 104, thereby allowing lock cam 102 and pivot pin 104 to be smaller and lighter than conventional components. Furthermore, the novel configuration of the present invention, compared to the pivotable pawl style design, allows the pawl component to be eliminated, thereby reducing the cost of the system.

Figure 7:
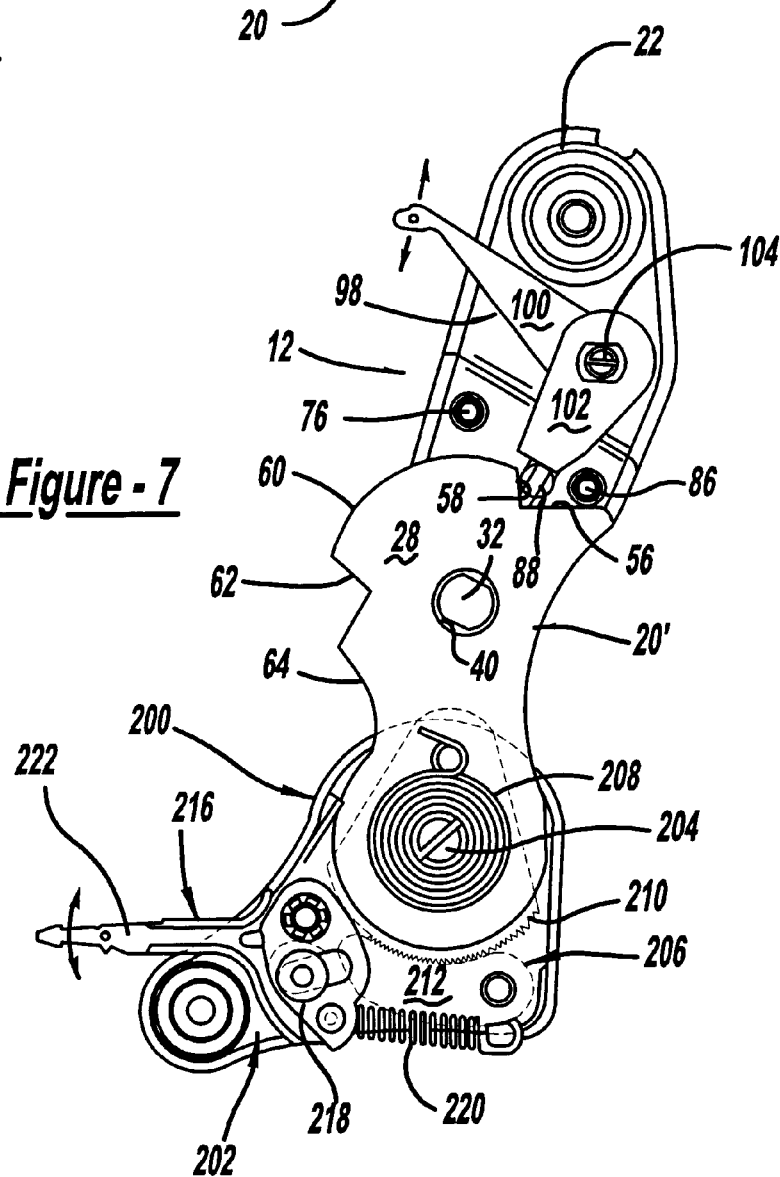
FIG. 7 is a side elevational view of the seatback latch mechanism mounted to a seat recliner mechanism for providing an independent seatback dump feature.

The application for seatback latch mechanism 12 shown in FIGS. 1 through 6 can also be used in association with fold-out components of seat assemblies such as, for example, trays, consoles and built-in child seats, for latching such components in both a stowed position and a deployed position. Moreover, seatback latch mechanism 12 can, as shown in FIG. 7, be used as a seatback dump mechanism 12' which is incorporated into a seat recliner 200. In this application, seat recliner 200 includes a mounting plate 202 adapted to be fixed to frame structure of seat bottom 16, and a modified quadrant 20' pivotally mounted to mounting plate 202 for rotation about a hinge pin 204. A recliner latch assembly 206 includes a sector plate 208 fixed for rotation with quadrant 20' and having teeth 210 formed thereon, and a lock pawl 212 supported from mounting plate 202 for pivotal movement between a locked position and a released position. In its locked position, teeth 214 on lock pawl 212 engage teeth 210 on sector plate 208 for latching seatback 14 in a desired use position. In its released position, teeth 214 are disengaged from teeth 210 on sector plate 208 for permitting angular movement of seatback 14 so as to adjust the use position of seatback 14 between an upright position and a fully-reclined position. A recline operator 216 is provided for normally locating and holding lock pawl 212 in its locked position. Recline operator 216 includes a cam 218 pivotably mounted to mounting plate 202 and a biasing spring 220 for normally biasing cam 218 into engagement with lock pawl 212 for holding lock pawl 212 in its locked position. A handle 222 can be selectively manipulated by the seat occupant to move cam 218 in opposition to biasing spring 220 for permitting lock pawl 212 to move from its locked position to its released position when it is desired to adjust the seatback use position.

Seatback dump mechanism 12' is normally operable with lock pin 86 held against first lock surface 58. However, when it is desired to dump seatback 14 to its forward dumped position, release actuator 98 is actuated by rotating handle 100 to its actuated position which, as previously mentioned, permits support plates 22 and 24 to rotate about pivot pin 32 from the upright position shown to its folded position, whereby seatback 14 moves from the use position established by seat recliner 200 to its forward dumped position. Seatback dump mechanism 12' prevents return of seatback 14 to its last use position until handle 100 is again rotated to release lock pin 86 from engagement with second lock surface 62. As such, seatback dump mechanism 12' works in conjunction with seat recliner 200 to permit independent adjustment of the seatback use position via actuation of recline operator 216 and independent folding of seatback 14 via actuation of release actuator 98. Due to such independent operation, seatback dump mechanism 12' acts as a "memory" dump mechanism since seatback 14 is returned to its last use position which is dictated by the angular position of quadrant 20' relative mounting plate 202.

Figure 8:
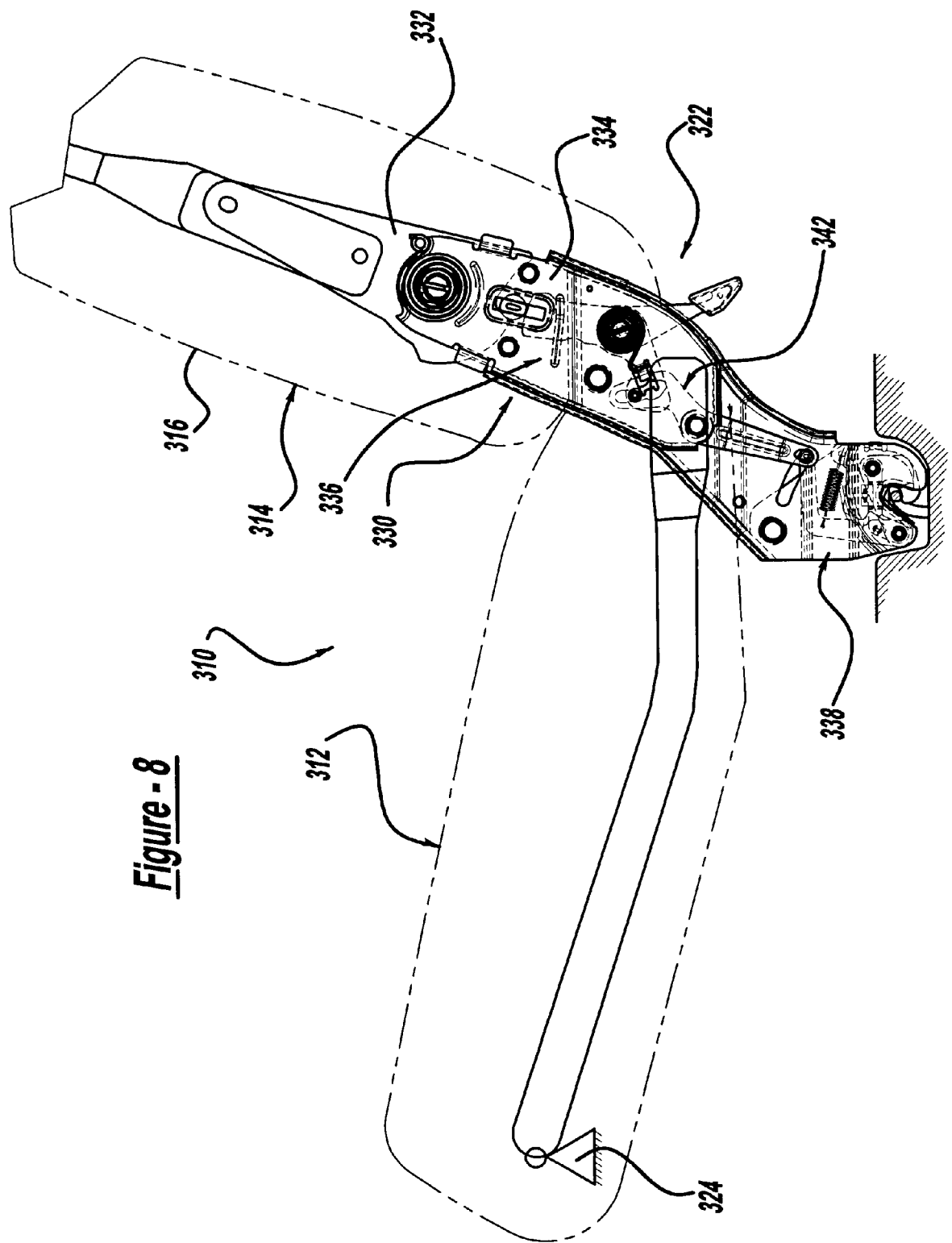
FIG. 8 is a left side elevation view of a seat hinge assembly according to a second embodiment of the present invention incorporated into a vehicle seat and illustrated in its deployed mode.

FIGS. 8–14 illustrate a seatback latch mechanism such as that described above incorporated into a seat hinge assembly adapted for use in a vehicle seat that is coupled to a vehicle for movement relative to the vehicle body between a stowed position and a deployed position. The seat hinge assembly includes first and second latch mechanisms interconnected via an interlock that ensures a predetermined sequence of latch operations when the vehicle seat is moved between its stowed and deployed modes. For exemplary purposes, FIG. 8 illustrates the vehicle seat 310 having an upholstered seat bottom 312 and an upholstered seatback 314.

As indicated above, vehicle seat 310 includes a seat hinge assembly 330 having an upper hinge member 332, a lower hinge member 334, a fold latch assembly 336 that is similar to the seatback latch mechanism 12 described above with reference to FIGS. 1–7 and that is operative to selectively fix the upper hinge member in its upright and folded positions, and a floor latch assembly 338 for selectively connecting the lower hinge member 334 to the vehicle body such as at floor striker 320. Seat hinge assembly 330 also includes an interlock assembly 342 that operatively couples fold latch assembly 336 to floor latch assembly 338 to ensure a predetermined sequence of operations. Finally, a release actuator 322 is operatively coupled to the fold latch assembly 336 and floor latch assembly 338 to allow an operator to move the latches in a predetermined sequence between the respective positions described below.

Figure 9:
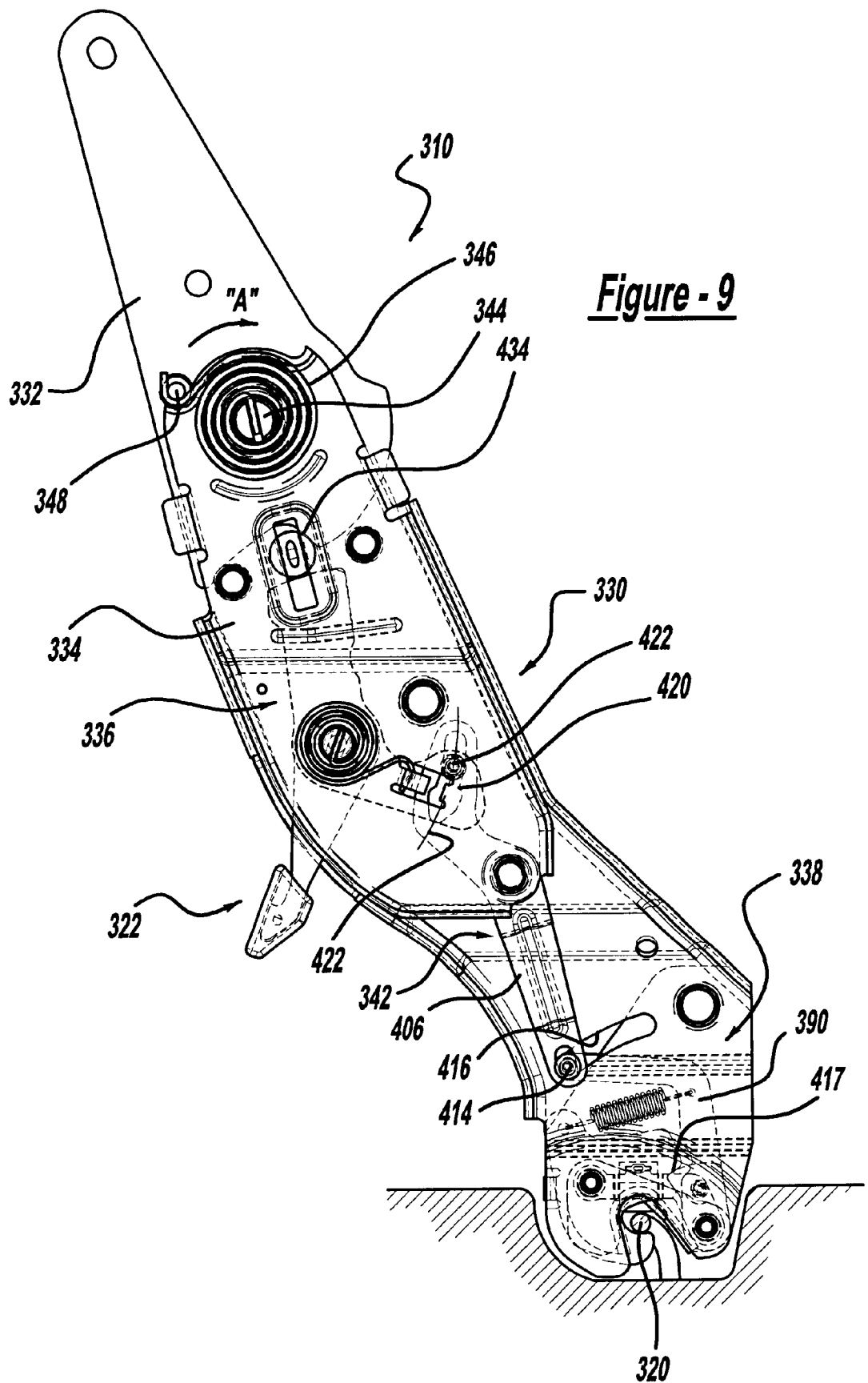
FIG. 9 is a right side elevation view of the seat hinge assembly shown in FIG.8.
Figure 14:
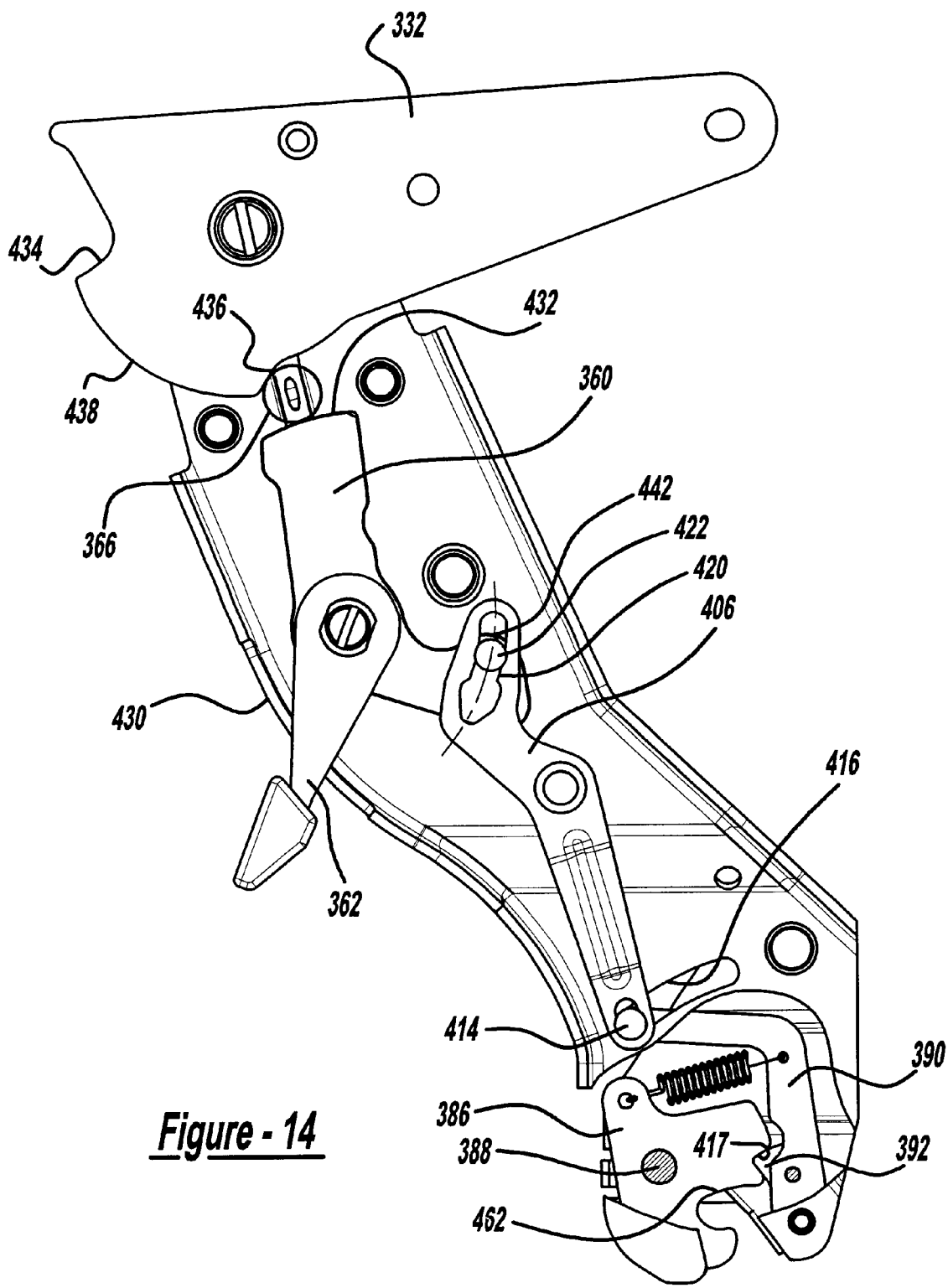
FIG. 14 is a side elevational view of the seat hinge assembly of the present invention similar to that shown in FIG. 13 with the floor latch in its latched mode upon return of the seat from its stowed position and the interlock in its enabling mode.

Upper hinge member 332 is coupled to lower hinge member 334 for pivotable movement about an inboard pivot 344 between an upright position (FIGS. 8 and 9) and a folded position (FIG. 14). A power spring 346 (FIGS. 9 and 10) is connected to inboard pivot 344 and a power spring mount rivet 348 fixed to upper hinge member 332 to create a biasing force that urges the upper hinge member to rotate in a clockwise direction toward its folded position about inboard pivot 344 as indicated in FIG. 9 by arrow "A". The seat bottom is connected to the vehicle body such as at a pivot 324 as shown in FIG. 8 to allow movement of the seat 310 between the illustrated deployed position and a stowed position. Notwithstanding the preferred illustration of the vehicle seat shown in FIG. 8, those skilled in the art will appreciate that the seat hinge assembly of the present invention as well as the interlock feature thereof may be used to operationally connect latch assemblies in various seat applications beyond the specific floor and fold latch configuration described herein.

The various modes and positions of the upper and lower hinge members, fold latch assembly, floor latch assembly, and interlock assembly are controllable through the selective positioning of release actuator 322 and will now be described with reference to FIGS. 8–14. Upper hinge member 332 is pivotable about inboard pivot 344 between an upright position illustrated in FIG. 8 and a folded position illustrated in FIGS. 12 and 14. Fold latch assembly 336 is operable in a locked mode as shown in FIGS. 8 and 14 to fix the angular position of the upper hinge member in its upright or folded positions relative to lower hinge member 334. Likewise, floor latch assembly 338 is operable in a latched mode for securing the lower hinge member in its deployed position through coupling engagement with striker 320 and an unlatched mode wherein the lower hinge member is pivotable about seat pivot 324.

Interlock assembly 342 intercouples the fold and floor latch assemblies to ensure proper sequencing of operations. More particularly, the interlock assembly 342 is operable in an enabling mode and a disabling mode. The interlock assembly is moved from its enabling mode, wherein the fold latch assembly is freely movable between its locked and unlocked modes, to its disabling mode when the floor latch assembly is moved to its unlatched mode. When in its disabling mode, the interlock assembly prevents movement of the fold latch assembly from its unlocked mode to its locked mode.

Figure 12:
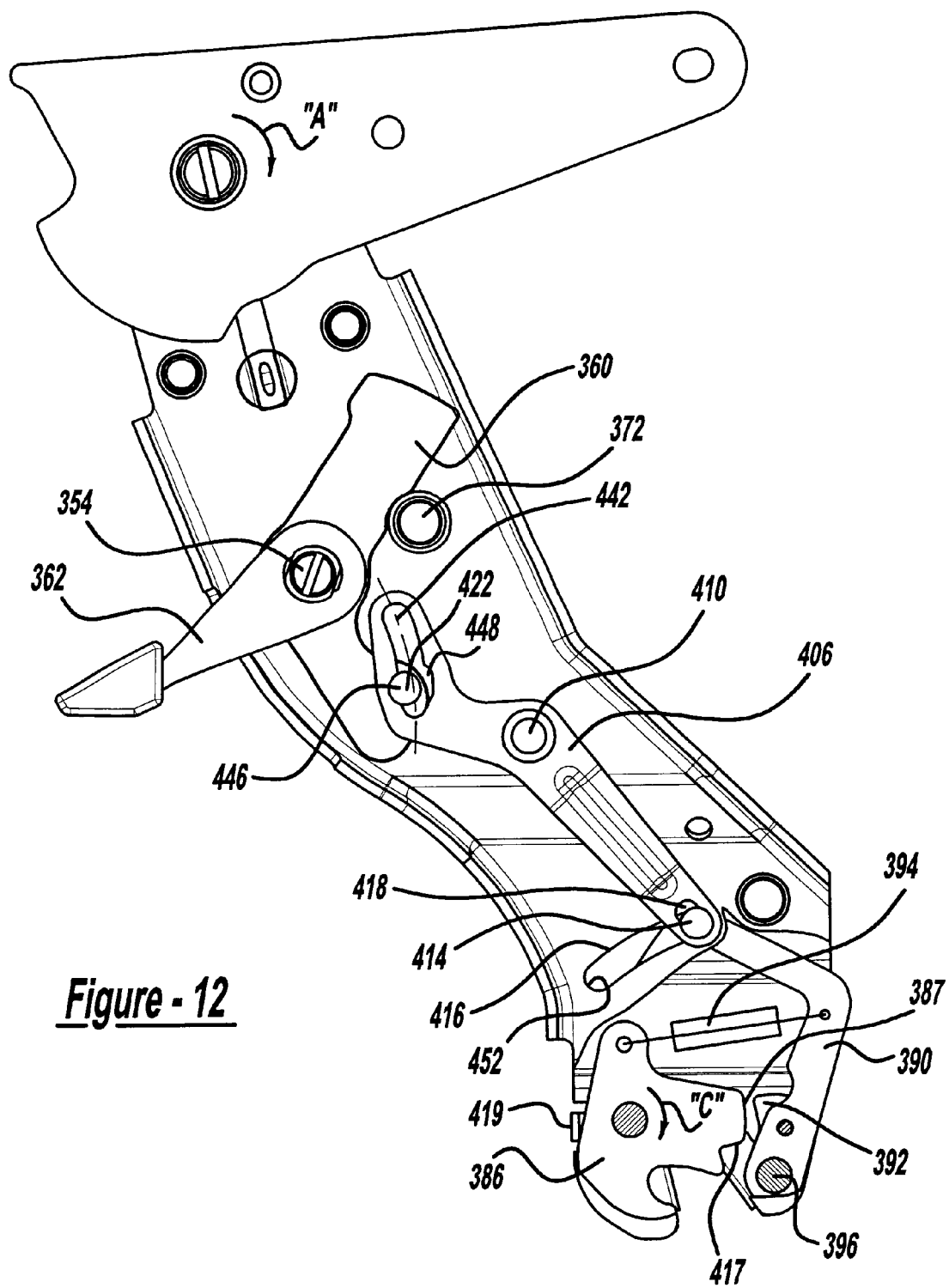
FIG. 12 is a side elevational view of the seat hinge assembly of the present invention similar to that shown in FIG. 11 with the floor latching mechanism in its unlatched mode and the fold latch mechanism in its unlocked mode.
Figure 13:
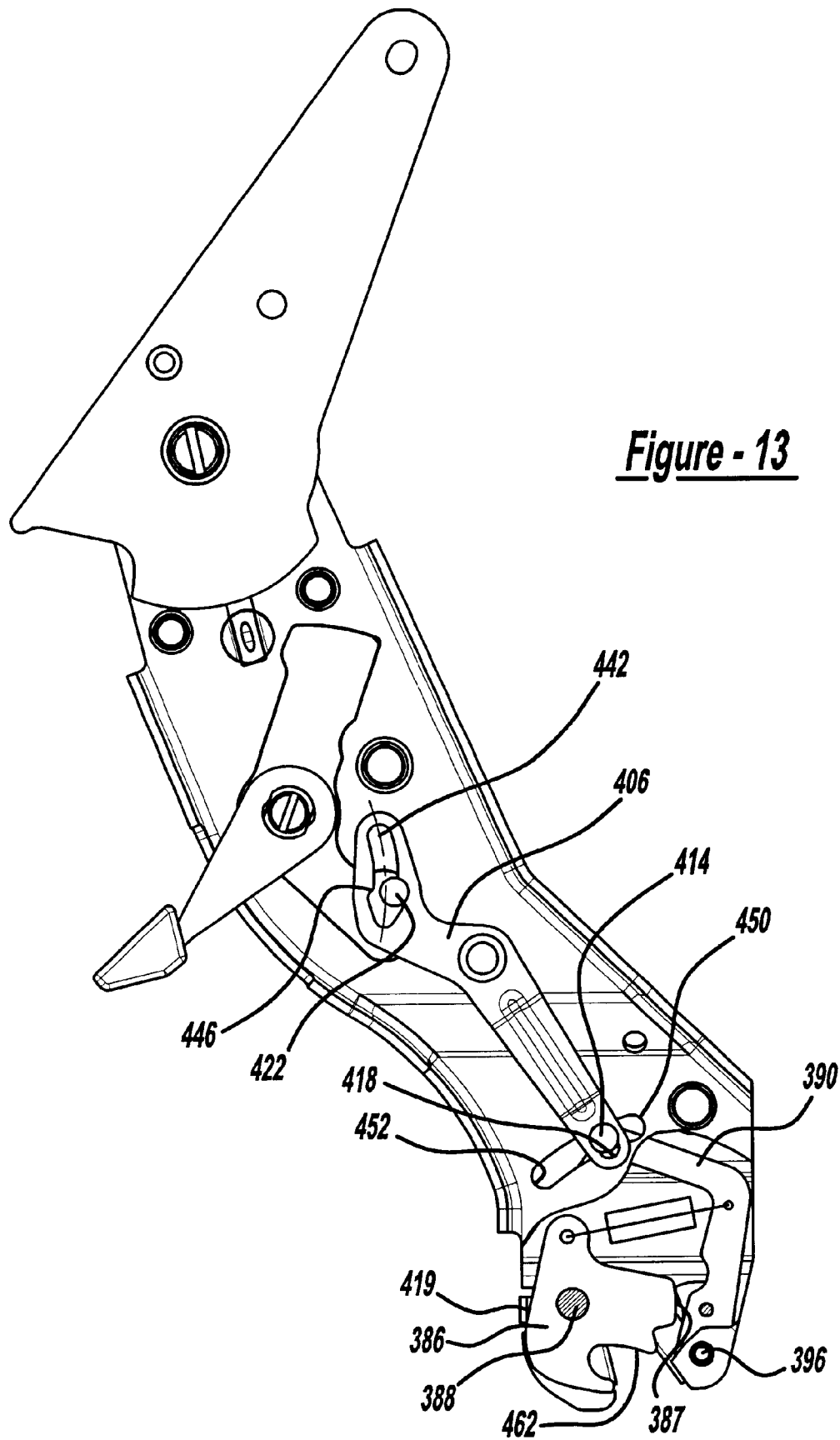
FIG. 13 is a side elevational view similar to that shown in FIG. 12 with the floor latch mechanism in its unlatched mode, the fold latch mechanism in its unlocked mode, and the interlock in its disabling mode to allow the vehicle seat to be fully tilted toward its stowed position.

Floor latch assembly 338 is moved from its latched mode to its unlatched mode by manipulation of release actuator 322 and, more particularly, release handle 362. Specifically, release handle 362 extends rearwardly from the vehicle seat for manipulation by an operator between a non-actuated position (FIG. 9), an intermediate actuated position (FIG. 11), a fully actuated position (FIG. 12), and an interlock equilibrium position (FIG. 13). When the release handle is in its non-actuated position, the floor latch and fold latch assemblies are in their latched and locked modes, respectively, with the interlock assembly in its enabling mode. When the release handle 362 is moved from its non-actuated position to its intermediate actuated position through clockwise rotation about a slave spindle 364, fold latch assembly 336 is moved into its unlocked mode while the interlock assembly 342 and floor latch assembly 338 remain in their enabling and latched modes, respectively. Movement of release handle 362 from its intermediate actuated position to its fully actuated position, and finally its interlock equilibrium position, moves the floor latch assembly to its unlatched mode and the interlock assembly 342 to its disabling mode.

As will be appreciated from the following description, the interlock assembly 342 prevents the fold latch assembly 336 from being moved into its locked mode when the floor latch assembly is in its unlatched mode. This interlock feature prevents the operator from securing the upper hinge member in its deployed position when the floor latch assembly is not secured to the vehicle floor. By maintaining the fold latch assembly in its unlocked mode when the floor latch assembly is in its unlatched mode, the interlock feature signals an operator trying to return the seatback 314 to its upright position that the floor latch assembly has not been properly seated in its latched mode. This feature minimizes the chances of the operator incorrectly assuming that the vehicle seat is properly secured to the floor simply by the placement of the fold latch into its locked mode. Additionally, power spring 346 urges the seatback 314 toward its folded position to prevent occupation of the seat when the floor latch assembly is in its unlatched mode.

Figure 10:
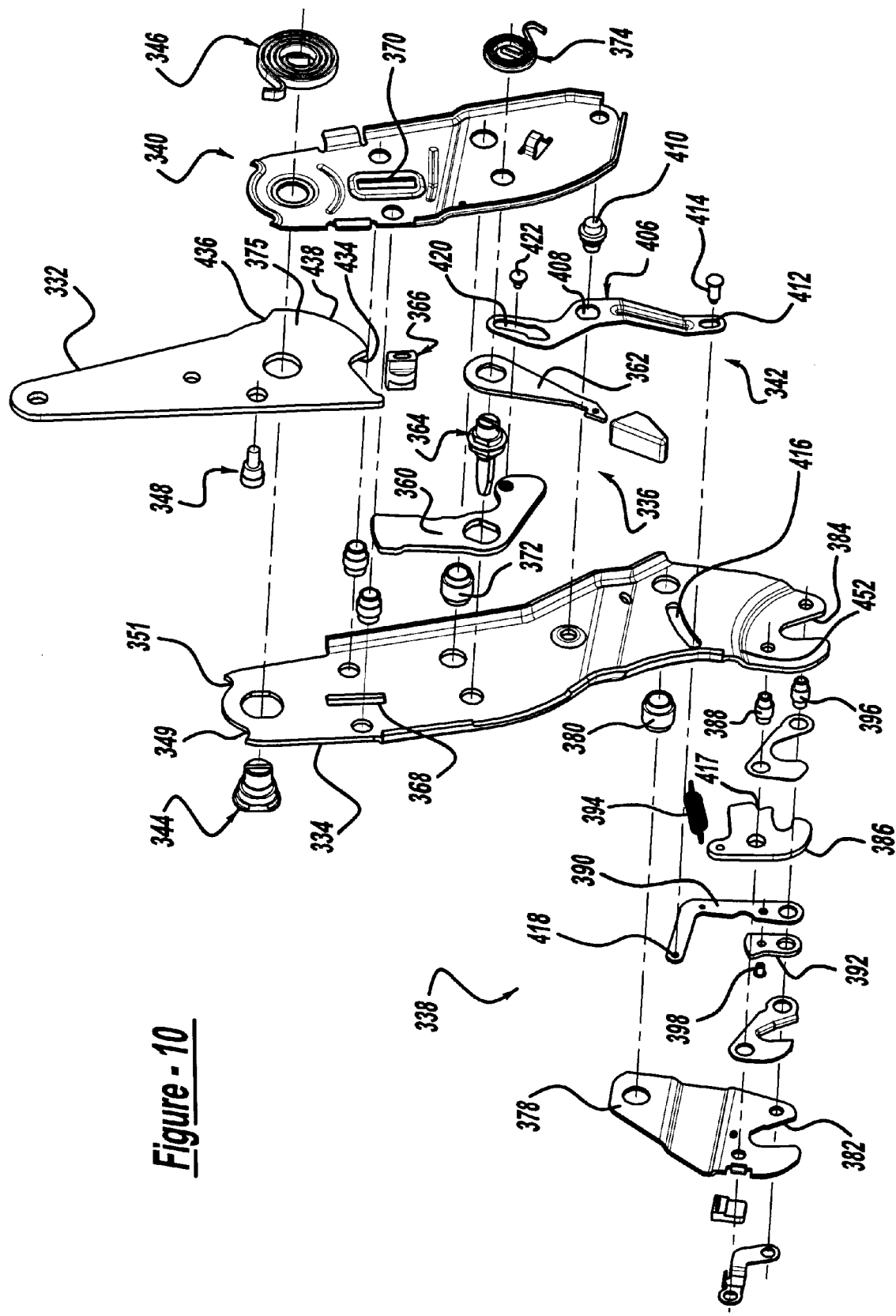
FIG. 10 is an exploded perspective view of the seat hinge assembly illustrated in FIGS. 8 and 9.

The components and respective configurations of the fold latch assembly 336, floor latch assembly 338, and interlock assembly 342 will now be described with reference to FIGS. 8–14. As generally discussed above, fold latch assembly 336 operates to selectively allow rotation of the upper hinge member 332 relative to the lower hinge member 334, lock the upper hinge member in an upright position (FIG. 9), or lock the upper hinge member in a folded position (FIG. 14). Fold latch assembly 336 is similar to the seatback latch mechanism 12 described above with reference to FIGS. 1–7 and includes a lock cam 360 and release handle 362 each coupled for pivotal movement relative to lower hinge member 334 via slave spindle 364. More particularly, as best shown in FIG. 10, release handle 362 and lock cam 360 are coupled for rotation with slave spindle 364 via cooperating flats on the spindle, cam, and handle. Fold latch assembly 336 also includes a sliding lock pin 366 that is disposed for movement within cooperating guide slots 368 and 370 in lower hinge member 334 and outer cover plate 340. Further, fold latch assembly 336 includes a stop pin 372 fixed to lower hinge member 334 and outer cover plate 340 to limit rotation of lock cam 360 as hereinafter described.

Figure 11:
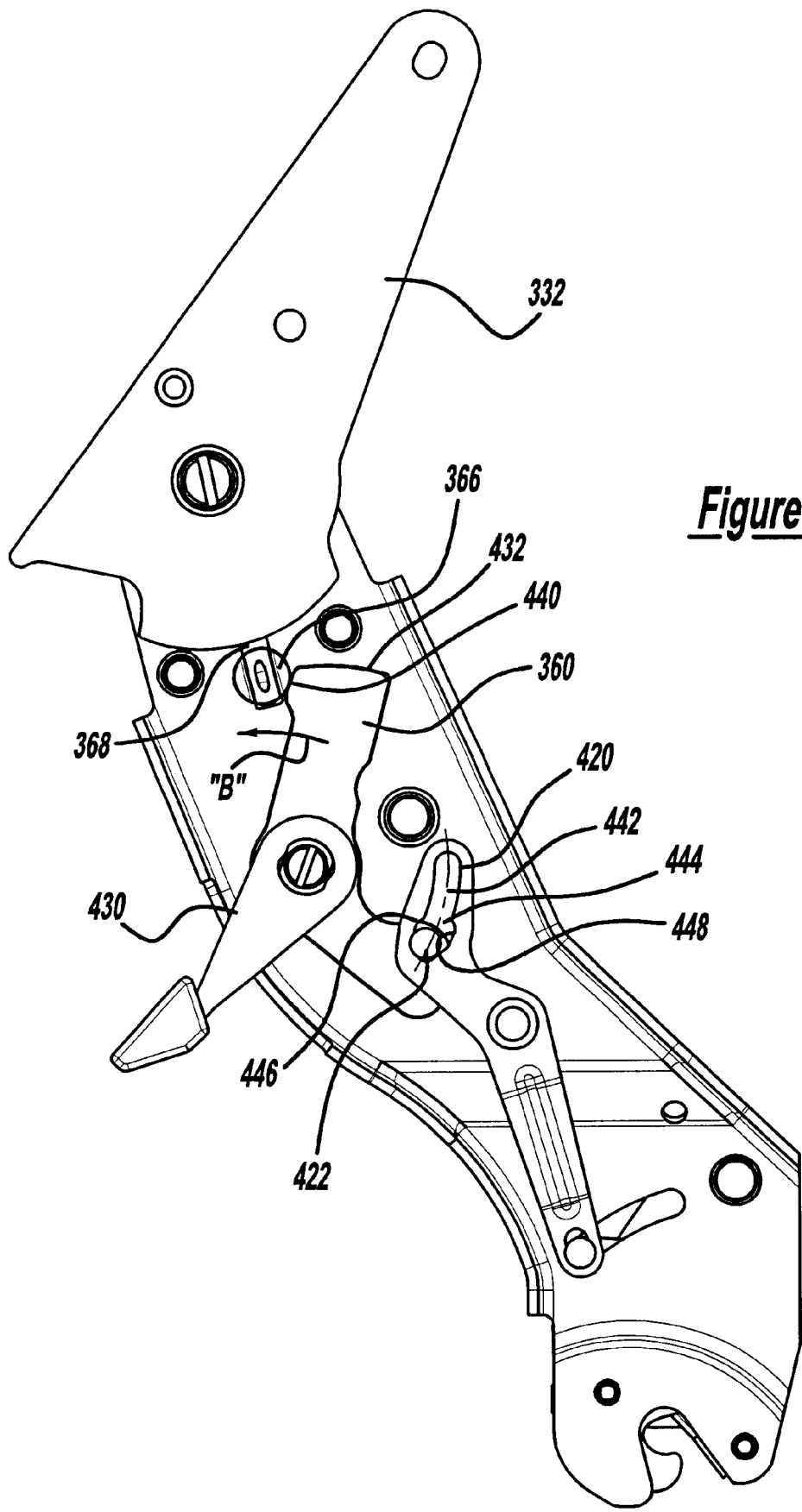
FIG. 11 is a side elevational view similar to that shown in FIG. 9 with the outer plate of the seat hinge assembly and the springs thereof removed for clarity and, further, with the fold latch mechanism of the seat hinge assembly in its unlocked mode to allow movement of the upper hinge member of the seat hinge assembly.

Fold latch assembly 336 further includes a handle spring 374 coupled to slave spindle 364 to bias the slave spindle 364, lock cam 360, and release handle 362 toward clockwise rotation in the direction of arrow "B" as shown in FIG. 11. Finally, fold latch assembly 336 includes a raised cam segment 375 on upper hinge member 332 that is similar to that described above with reference to FIGS. 1–7 and that sequentially defines a first locking surface 434, an arcuate dwell surface 438, and a second locking surface 436. It should be appreciated that the sliding lock pin 366 engages the first locking surface 434 under the urging of lock cam 360 when the upper hinge member is in its upright position (FIG. 9), that is, when mount rivet 348 abuts an upright dwell surface 349 on the upper end of lower hinge member 334. Similarly, sliding lock pin 366 engages the second locking surface 436 under the urging of lock cam 360 when the upper hinge member is in its folded position (FIG. 14), that is, when mount rivet 348 abuts fold dwell surface 351 (FIG. 10).

As noted above, fold latch assembly 336 is movable from its locked mode to its unlocked mode when the fold latch mechanism 338 is in its latched mode. Fold latch assembly 336 is movable between its locked mode to its unlocked mode (FIG. 11) by pivoting release handle 362 clockwise toward an upper end of handle slot 430 thereby pivoting fold cam 360 from its camming position to its first intermediate released position illustrated in FIG. 11. As fold cam is displaced in a clockwise direction against the biasing force of handle spring 374, upper cam surface 432 of fold cam 360 is displaced out of engagement with sliding pin 366 whereupon lock surface 434 moves sliding pin 366 downwardly within guide slots 368 and 370 to a retracted position illustrated in FIGS. 11–13 as the upper hinge member 332 rotates clockwise. As shown in FIG. 11, the biasing force of handle spring 374 in the direction of arrow "B" urges the fold cam to rotate in a counterclockwise direction whereupon an abutment face 440 of fold cam 360 engages sliding pin 366. The engagement between sliding pin 366 and arcuate dwell surface 438 prevents the return of the fold cam to its camming position under the bias of spring 374 so long as the upper hinge member is between its upright and forward folded positions.

As is best illustrated in FIG. 10, floor latch assembly 338 includes a floor plate 378 coupled to lower hinge member 334 via a spacer 380 and positioned relative to lower hinge member 334 to protect the operative components of the floor latch assembly as hereinafter described. It should be noted that floor plate 378 and lower hinge member 334 each include a striker recess 382 and 384, respectively, which cooperate with similarly configured recesses in the hereinafter described components of floor latch assembly 338 to accommodate a striker pin 320 (FIGS. 8 and 9) when the seat is in its deployed position. Floor latch assembly 338 also includes a latch plate 386 coupled for pivotal movement relative to lower hinge member 334 and floor plate 378 via a latch plate pivot 388, a latch lever 390, latch cam 392, extension spring 394, and various bumpers and spacers as illustrated in FIG. 10. Latch lever 390 and latch cam 392 are each pivotably coupled to floor plate 378 and lower hinge member 334 via a lower latch pivot 396 and coupled for rotation with one another by cam lever rivet 398. Extension spring 394 is coupled to latch plate 386 and latch lever 390 above their respective pivot points such as through the illustrated apertures to bias the latch plate toward clockwise rotation and the latch lever toward counterclockwise movement as hereinafter described.

When floor latch assembly 338 is in its latched mode as illustrated in FIGS. 9 and 14, latch plate 386 engages striker 320 and latch lever 390 is rotated fully counterclockwise such that floor lever pin 414 is at a latch end 452 (FIG. 12) of latch slot 416. Inadvertent clockwise rotation of latch plate 386 is prevented through the abutting engagement of latch cam 392 with a recessed notch 417 formed in latch plate 386.

Floor latch assembly 338 is moved into its unlatched mode through clockwise rotation of latch lever 390 about lower latch pivot 396. Specifically, counterclockwise rotation of interlock link 406 in the manner hereinafter described causes rotation of latch lever 390 through the coupling engagement of floor lever pin 414. When latch cam 392 is rotated out of engagement with recessed notch 417, latch plate 386 rotates in a clockwise direction (Arrow "C" in FIG. 12) under the biasing of extension spring 394 thereby placing floor latch assembly 338 in its unlatched mode and releasing striker 320.

From the foregoing description, it will be generally appreciated that movement of fold latch assembly 336 and floor latch assembly 338 is achieved through actuation of release handle 362 and the operative intercoupling of the fold and floor latch assemblies through interlock assembly 342. More particularly, as is shown in FIG. 10, interlock assembly 342 includes an interlock link 406 having a central aperture 408 for pivotably coupling the interlock link 406 to the lower hinge member 334 and outer cover plate 340 via lever pivot 410, an elongated oval shaped lower aperture 412 adapted to accommodate the floor lever pin 414 that is disposed for movement within latch slot 416 and coupled to latch lever 390 such as at latch passage 418, and an upper motion slot 420 adapted to accommodate a cam pin 422 fixed for movement with fold cam 360.

As to the operation of the interlock feature of the present invention, particular attention should be paid to the relative position of the cam pin 422 within motion slot 420 as the fold latch assembly and floor latch assemblies are moved between their respective modes. Specifically, when the floor latch assembly is maintained in its latched mode and the fold latch assembly is moved between its locked and unlocked modes as described above and illustrated in FIGS. 9, 11, and 14, interlock link 406 remains stationary in its enabling mode and cam pin 422 moves along a motion axis 442 defined by motion slot 420. It should be appreciated that when the cam pin 422 is substantially aligned with motion axis 442, the cam pin 422, and therefore the fold cam 360 to which the cam pin 422 is fixed, is movable within the slot 420 and, more particularly, into and out of a release pocket 444 defined by motion slot 420 without engaging an unlatch detent 446 or an interlock detent 448 (FIG. 11) formed at the entrance to the release pocket.

Conversely, when the floor latch assembly 338 is moved into its unlocked mode (FIGS. 12 and 13), the interlock link 406 is pivoted about lever pivot 410 and into its disabling mode thereby altering the alignment between the arcuate movement of cam pin 422 and the motion axis 442 of motion slot 420. More particularly, when the release handle 362 is moved from its intermediate actuated position shown in FIGS. 9 and 11 to its fully actuated position shown in FIG. 12, the cam pin 422 rotates with fold cam 360 and moves interlock link 406 from its aligned position (FIG. 11) to its full offset position (FIG. 12). In this position, fold cam 360 engages stop pin 372 and cam pin 422 engages unlatch detent 446. Counterclockwise rotation of link 406 causes displacement of floor lever pin 414 within latch slot 416 from latch end 452 to release end 450 and corresponding clockwise rotation of latch lever 390 about lower latch pivot 396. Once latch cam 392 is rotated out of engagement with recessed notch 417, latch plate 386 rotates clockwise to abut a flange 419 extending from lower hinge member 334 thereby releasing the strike pin and placing the floor latch mechanism in its unlatched mode.

Upon the operator's release of handle 362, the handle moves from its full actuated position shown in FIG. 12 to an interlock equilibrium position (FIG. 13) under the biasing force of handle spring 374. At the same time, fold cam 360 rotates counterclockwise to the position shown in FIG. 13. Similarly, the biasing force of extension spring 394 rotates latch lever 390 from its full actuated position (FIG. 12) to its actuated interlock position (FIG. 13). More particularly, latch lever 390 and latch cam 392 rotate counterclockwise about lower latch pivot 396 until cam 392 is blocked by a dwell surface 387 of latch plate 386. As a result, floor lever pin 414 moves from a release end 450 of latch slot 416 toward a latch end 452 thereof and upwardly within elongated latch passage 418. Interlock link 406 moves with floor lever pin 414 thereby rotating in a clockwise direction from its full offset position (FIG. 12) to its interlock offset position (FIG. 13). The coordinated movement of fold cam 360 and interlock link 406 causes cam pin 422 to move across release pocket 444 from unlatch detent 446 to engage interlock detent 448 placing the interlock assembly in its disabling mode. The locked engagement between interlock detent 448 and cam pin 422 prevents an operator from moving fold latch assembly 336 from its unlocked mode to its locked mode. The interlock engagement between the cam pin 422 and interlock detent 448 is maintained by the biasing forces of handle spring 374 and extension spring 394.

In the interlock position illustrated in FIG. 13, the floor latch assembly 338 is in its unlatched mode and the vehicle seat 310 is movable about pivot 324 from its deployed position to its stowed position. When the vehicle seat is tilted from its stowed position toward its deployed position, the engagement of striker pin 320 with a contact face 462 of latch plate 386 displaces the latch plate counterclockwise about latch plate pivot 388 and the extension spring 394 rotates latch lever 390 counterclockwise about lower latch pivot 396 until latch cam 392 lockingly engages the latch plate 386 as shown in FIG. 14. With the floor latch assembly returned to its latched mode, the latch lever 390 is moved from its actuated interlock position (FIG. 13) to its unactuated position (FIGS. 11 and 14) thereby rotating interlock link 406 clockwise such that the motion axis 442 of motion slot 420 aligns with the arcuate path of cam pin 422 to allow free movement of fold latch assembly 336 between its locked and unlocked modes in the manner discussed with reference to FIG. 11.

From the above description, the enclosed drawings, as well as the appended claims, those skilled in the art should appreciate that the interlock assembly described and claimed herein provides a simple, effective, durable, and cost efficient assembly for disabling a second latching mechanism, such as fold latch assembly 336, based upon the mode or condition of a first latching mechanism, such as floor latch assembly 338. In the illustrated embodiment, the seat hinge assembly 330 of the present invention disables the fold latch assembly 336 when the floor latch assembly 338 is in its unlatched mode. The disablement of the fold latch assembly signals the operator that the latch plate 386 is not fully engaged with the striker pin coupled to the vehicle. This signaling is enhanced by maintaining the fold latch assembly 336 in its unlocked mode thereby allowing the upper hinge member 332 to be freely rotatable relative to the lower hinge member 334. Without the ability to lock the upper hinge member 332 relative to the lower hinge member 334, it is anticipated that the operator will realize that the floor latch member is not properly engaged.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seat hinge assembly for use with a vehicle seat connectable to a striker on a vehicle body, the seat hinge assembly comprising:

a lower hinge member;

an upper hinge member;

a first latching mechanism operable in a latched mode to couple one of said lower hinge member and said upper hinge member to the striker and in an unlatched mode to allow movement of said one of said lower hinge member and said upper hinge member relative to the striker;

a second latching mechanism operable in a locked mode to secure the other of said lower hinge member and said upper hinge member in a fixed position relative to said one of said lower hinge member and upper hinge member and in an unlocked mode to allow movement of the other of said lower hinge member and upper hinge member relative to said one of said lower hinge member and upper hinge member; and an interlock operatively coupled to said first and second latching mechanisms, said interlock being operable in a disabling mode when said first latching mechanism is in said unlatched mode wherein said interlock prevents movement of said second latching mechanism from said unlocked mode to said locked mode, and said interlock being operable in an enabling mode when said first latching mechanism is in said latched mode allowing movement of said second latching mechanism from said unlocked mode to said locked mode.

2. The seat hinge assembly of claim 1 wherein movement of said first latching mechanism into said unlatched mode causes movement of said interlock into its disabling mode.

3. The seat hinge assembly of claim 2 wherein movement of said first latching mechanism into said latched mode causes movement of said interlock into its said enabling mode.

4. The seat hinge assembly of claim 1 further including a release coupled to one of said upper and lower hinge members for movement between a non-actuated position, an intermediate actuated position, and an interlock position, said release coupled to said second latching mechanism to move said second latching mechanism into its locked mode when said release is moved to said non-actuated position and into said unlocked mode when said release is moved into said intermediate actuated position.

5. The seat hinge assembly of claim 4 wherein said release is coupled to said interlock to move said interlock between said enabling and disabling modes when said release is moved between said intermediate actuated position and said interlock position.

6. The seat hinge assembly of claim 5 wherein said interlock is coupled to said first latching mechanism to move said first latching mechanism between said latched and unlatched modes when said interlock is moved between said enabling and disabling modes.

7. The seat hinge assembly of claim 6 wherein said interlock includes a link assembly interconnecting said first and second latching mechanisms, said link assembly moving between an aligned position when said interlock is in said enabling mode and an offset position when said interlock is in said disabling mode.

8. The seat hinge assembly of claim 7 wherein said link assembly includes a pin coupled to said second latching mechanism for movement therewith along a travel path and a link having a slot defining a motion axis, said travel path being coaxial with said motion axis when said interlock is in said enabling mode, said travel path being out of alignment with said motion axis when said interlock is in said disabling mode.

9. The seat hinge assembly of claim 8 wherein when said interlock is in said enabling mode said pin moves coaxial with said motion axis along said travel path between a first position when said second latching mechanism is in said locked mode and a second position when said second latching mechanism is in said unlocked mode.

10. The seat hinge assembly of claim 9 wherein said link includes a detent offset from said motion axis, said pin engaging said detent to prevent movement of said second latching mechanism to said locked mode when said interlock is in said disabling mode.

11. The seat hinge assembly of claim 10 wherein said link includes a passage and a pivot between said slot and said passage, said slot includes an enlarged pocket, said detent being adjacent said enlarged pocket, said first latching mechanism including a rivet pin disposed in said passage to operatively couple said first latching mechanism to said link.

12. The seat hinge assembly of claim 11 wherein said first latching mechanism includes a latch plate, a latch lever, and a cam coupled for movement with said latch lever, said rivet pin coupling said latch lever to said link, said latch lever pivotably coupled to said lower hinge member and to move said cam to block said latch plate into an engaged position when said first latching mechanism is in said latched mode.

13. The seat hinge assembly of claim 6 wherein said interlock includes a pin and a link, said link having a slot, an unlatch detent, and an interlock detent, said pin fixed to said second latching mechanism for movement therewith and engaging said interlock detent when said interlock is in said disabling mode.

14. The seat hinge assembly of claim 13 wherein said link further includes a second slot and a second pin slidably coupled to said second slot and fixed for movement with said first latching mechanism.

15. A seat hinge assembly of claim 13 wherein said release is coupled to one of said upper and lower hinge members for movement from said intermediate actuated position, past said interlock position, and into a full actuated position, wherein said seat hinge assembly further includes a spring biasing said release from said full actuated position to said interlock position, and wherein said pin engages said unlatch detent when said release is in said full actuated position.

16. A seat for use with a vehicle having a striker, the seat being coupled to the vehicle for movement relative thereto between a deployed position and a stowed position, said seat comprising:
   a seat bottom;
   a seatback;
   a seat hinge assembly having an upper hinge member coupled to the seatback and a lower hinge member coupled to the seat bottom, said seat hinge assembly further including a first latching mechanism operable in a latched mode to couple the lower hinge member to the striker and in an unlatched mode to allow movement of said lower hinge member relative to the striker, a second latching mechanism operable in a locked mode to secure said upper hinge member in a fixed position relative to said lower hinge member and in an unlocked mode to allow movement of said upper hinge member relative to said lower hinge member, and an interlock assembly operatively engaging said first and second latching mechanisms and operable in a disabling mode when said first latching mechanism is in said unlatched mode wherein said interlock assembly prevents movement of said second latching mechanism from said unlocked mode to said locked mode and in an enabling mode when said first latching mechanism is in said latched mode to allow movement of said second latching mechanism from said unlocked mode to said locked mode.

17. The seat of claim 16 wherein movement of said first latching mechanism into said unlatched mode causes movement of said interlock into its disabling mode.

18. The seat of claim 17 wherein movement of said first latching mechanism into said latched mode causes movement of said interlock into its said enabling mode.

19. The seat of claim 17 further including a release coupled to one of said upper and lower hinge members for movement between a non-actuated position, an intermediate actuated position, and an interlock position, said release coupled to said second latching mechanism to move said second latching mechanism into its locked mode when said release is moved to said non-actuated position and into said unlocked mode when said release is moved into said intermediate actuated position.

20. The seat of claim 19 wherein said release is coupled to said interlock to move said interlock between said enabling and disabling modes when said release is moved between said intermediate actuated position and said interlock position.

21. The seat of claim 20 wherein said interlock is coupled to said first latching mechanism to move said first latching mechanism between said latched and unlatched modes when said interlock is moved between said enabling and disabling modes.

22. The seat of claim 21 wherein said interlock includes a link assembly interconnecting said first and second latching mechanisms, said link assembly moving between an aligned position when said interlock is in said enabling mode and an offset position when said interlock is in said disabling mode.

23. The seat of claim 22 wherein said link assembly includes a pin coupled to said second latching mechanism for movement therewith along a travel path and a link having a slot defining a motion axis, said travel path being coaxial with said motion axis when said interlock is in said enabling mode, said travel path being out of alignment with said motion axis when said interlock is in said disabling mode.

24. The seat of claim 23 wherein when said interlock is in said enabling mode said pin moves coaxial with said motion axis along said travel path between a first position when said second latching mechanism is in said locked mode and a second position when said second latching mechanism is in said unlocked mode.

25. The seat of claim 24 wherein said link includes a detent offset from said motion axis, said pin engaging said detent to prevent movement of said second latching mechanism to said locked mode when said interlock is in said disabling mode.

26. The seat of claim 21 wherein said interlock includes a pin and a link, said link having a slot, an unlatch detent, and an interlock detent, said pin fixed to said second latching mechanism for movement therewith and engaging said interlock detent when said interlock is in said disabling mode.

27. The seat of claim 26 wherein said link further includes a second slot and a second pin slidably coupled to said second slot and fixed for movement with said first latching mechanism.

28. A seat of claim 26 wherein said release is coupled to one of said upper and lower hinge members for movement from said intermediate actuated position, past said interlock position, and into a full actuated position, wherein said seat hinge assembly further includes a spring biasing said release from said full actuated position to said interlock position, and wherein said pin engages said unlatch detent when said release is in said full actuated position.

29. A latch assembly comprising:
   a first latching mechanism operable in a latched mode and in an unlatched mode;
   a second latching mechanism operable in a locked mode and in an unlocked mode; and
   an interlock operatively engaging said first and second latching mechanisms, said interlock being operable in a disabling mode when said first latching mechanism is in said unlatched mode wherein said interlock prevents movement of said second latching mechanism from said unlocked mode to said locked mode, and said interlock being operable in an enabling mode when said first latching mechanism is in said latched mode allowing movement of said second latching mechanism from said unlocked mode to said locked mode.

30. The latch assembly of claim 29 wherein movement of said first latching mechanism into said unlatched mode causes movement of said interlock into its disabling mode and wherein movement of said first latching mechanism into said latched mode causes movement of said interlock into its said enabling mode.

31. The latch assembly of claim 29 further including a release movable between a non-actuated position, an intermediate actuated position, and an interlock position, said release coupled to said second latching mechanism to move said second latching mechanism into its locked mode when said release is moved to said non-actuated position and into said unlocked mode when said release is moved into said intermediate actuated position.

32. The latch assembly of claim 31 wherein said release is coupled to said interlock to move said interlock between said enabling and disabling modes when said release is moved between said intermediate actuated position and said interlock position and wherein said interlock is coupled to said first latching mechanism to move said first latching mechanism between said latched and unlatched modes when said interlock is moved between said enabling and disabling modes.

33. The latch assembly of claim 32 wherein said interlock includes a link assembly interconnecting said first and second latching mechanisms, said link assembly moving between an aligned position when said interlock is in said enabling mode and an offset position when said interlock is in said disabling mode.

34. The latch assembly of claim 33 wherein said link assembly includes a pin coupled to said second latching mechanism for movement therewith along a travel path and a link having a slot defining a motion axis, said travel path being coaxial with said motion axis when said interlock is in said enabling mode, said travel path being out of alignment with said motion axis when said interlock is in said disabling mode.

* * * * *